United States Patent [19]

Katzakian, Jr. et al.

[11] 4,028,234
[45] * June 7, 1977

[54] BUFFERING AGENTS

[75] Inventors: Arthur Katzakian, Jr., Sacramento; David O. DePree, Loomis, both of Calif.

[73] Assignee: Aerojet-General Corporation, El Monte, Calif.

[ * ] Notice: The portion of the term of this patent subsequent to Dec. 23, 1992, has been disclaimed.

[22] Filed: Sept. 18, 1975

[21] Appl. No.: 614,428

Related U.S. Application Data

[63] Continuation-in-part of Ser. No. 476,966, June 6, 1974, abandoned.

[52] U.S. Cl. .......................... 210/37 R; 210/38 R; 210/284
[51] Int. Cl.² .................................. B01D 15/04
[58] Field of Search .......... 210/30 R, 32, 34, 37 R, 210/37 B, 38 R, 38 A, 38 B, 38 C, 269, 284; 260/2.2 R, 2.2 C

[56] References Cited

UNITED STATES PATENTS

| | | | |
|---|---|---|---|
| 2,837,488 | 6/1958 | Ferris | 260/2.2 R |
| 3,679,580 | 7/1972 | Boari et al. | 210/38 |
| 3,928,192 | 12/1975 | Katzakian et al. | 210/30 R |

OTHER PUBLICATIONS

Nachod et al., Ion Exchange Technology, Academic Press Inc., 1956, p. 622.
Chemical Abstract, vol. 64, Abstract No. 17999(e), 1966.

*Primary Examiner*—Thomas G. Wyse
*Assistant Examiner*—Ivars Cintins
*Attorney, Agent, or Firm*—Edward O. Ansell; Marvin E. Jacobs

[57] ABSTRACT

An improved process for water demineralization involving the use of a first separate column of weakly acidic cation exchange resin, a second separate column of weakly basic anion exchange resin and a third separate column of weakly acidic cation exchange resin. The cation resin is buffered with an at least dihydroxy-substituted amine. When the saline feed is passed through the system, the cations of the feed are exchanged for the buffer, releasing buffered salts. The buffered salts when passed through the anion exchange column are split, releasing the buffer that is then deposited on the third cation resin column. The latter column is then used as the first separate column during the next demineralization cycle. Thus, the buffer is internally looped which prevents contamination of the product water and also resulting in a saving of buffer. This process allows the efficient use of weak cation and anion exchange resins in a separate, fixed-bed configuration.

9 Claims, 2 Drawing Figures

BUFFERING AGENTS

CROSS-REFERENCE TO RELATED APPLICATION

This application is a continuation-in-part of Ser. No. 476,966 filed June 6, 1974 now abandoned.

BACKGROUND OF THE INVENTION

1. Field of the Invention

The present invention relates to the demineralization of brackish and waste water streams and, more particularly, to an improved process for removing the salts from waste streams by the use of weak acid, ion-exchange resins.

2. Description of the Prior Art

Water is becoming an increasingly scarce natural resource and with increasing population and industrial and commercial use of water, ionic pollution in the form of waste and by-product streams from industrial plants, refineries and municipal sewage is having a drastic effect on the ecological balance of lakes, rivers, streams and even the oceans. Ionic pollution is found to destroy the food chain of marine life and in some cases so upsets the biological balance as to cause hazards to swimmers and fishermen. Even low level ionic pollution in irrigation waters can have a drastic effect in terms of the accumulation of salts in the soil over extended periods of time. One of the main concerns of the present invention is to provide a method for demineralizing industrial and other waste streams prior to discharge into surface waterways. Water can be demineralized by many processes such as distillation, reverse osmosis, chemical precipitation or ion exchange.

Since the development of commercially practicable synthetic ion exchange resins, ion exchange techniques have been the preferred methods for demineralizing water because of the high purity water produced, i.e. low total dissolved solids (TDS). However, the chemical costs for these systems have been quite high per unit of various salts removed. The ion exchange method which conventionally has been used consisted of the use of beads of strong acid cation exchanger in the hydrogen form.

Deionization processes employing weak acid and weak base resins have also been utilized. Two very real advantages in using these weak resins are the achievement of very high regeneration efficiencies, and a high theoretical loading capacity.

One recent advance to this art is the ion exchange technique which utilizes a buffered system and is described in Katzakian, el al, copending application Ser. No. 476,835, filed June 6, 1974, now U.S. Pat. No. 3,928,192, issued Dec. 23, 1975 and assigned to the same assignee as the instant application, the disclosure of which is incorporated herein by reference. This system does not have the problems of the prior art and in addition it allows a wide choice of resin combinations, while still allowing the practitioner to take advantage of the high theoretical loading capability.

The subject matter of that application may be illustrated by the following reactions:

Preparation

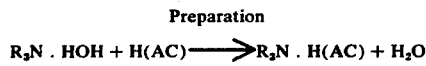

Cation Loading

-continued

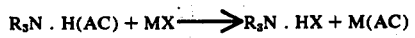

Anion Loading

Buffer Pick-Up

where
H(AC) = Cation resin, H form
$R_3N \cdot HOH$ = Buffer
MX = Inorganic salt M = cation X = anion
(AN) HOH = Anion resin, OH form In reaction I, the weak cation resin in the lead column is buffered as by the addition of a hydrated amine to yield the amine salt of the resin and water.

In reaction II, the feed stock (MX) is passed through the column and the metal ion "M" displaces the amine by ion exchange and the amine acid salt is liberated.

In reaction III, the amine acid salt formed is passed through one or more anion columns, the number of columns being based on the embodiment being practiced, and the acid salt of the anion resin (AN)HX is formed with the liberation of hydrated amine buffer.

In reaction IV, the liberated amine buffer is picked up by the next cation resin column to form the buffered cation resin for recycling.

It has now been discovered that certain buffers give rise to better operating capability, and the performance of these buffers can be tailored to the particular water streams by employing the specific teachings recited herein.

SUMMARY OF THE INVENTION

This invention allows the efficient use of weak acid cation and weak base anion exchange resins in a separated, fixed-bed or moving bed, both current and countercurrent configurations for the purpose of removing salts from brackish and waste water streams. The instant process minimizes expenditures for chemicals by recycling all reagents required in the process and by otherwise limiting reagent losses. A further advantage of the instant improved process is that it is compatible with state of the art regeneration techniques.

Generally the process of the invention comprises the steps of passing the feed stock through a weak cation resin buffered with at least one member of a particular class of hydroxyl-substituted organic amines and exchanging the cations of the feed for the buffer and releasing buffered salts. The released buffered salts are then passed through a bed of weak anion exchange resin to remove the anions releasing the buffer. The released amine buffer is then deposited on a further bed of weak cation exchange resin which when loaded is used as the first bed of the next demineralization cycle while the first bed is regenerated.

Other preferred features of the invention relate to particular requirements on the basicities of each resin correlated to the structure and basicity of the class of particular amines comprising this invention.

The process and system of the invention may be illustrated by the following reactions:

Preparation

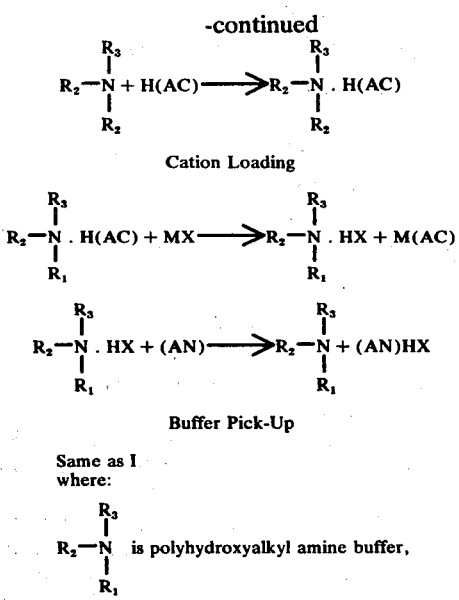

Cation Loading

Buffer Pick-Up

Same as I
where:

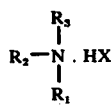 is polyhydroxyalkyl amine buffer,

H(AC) is cation resin in H form,
MX is an inorganic salt where M is a cation and X is an anion, $$R_2-\underset{R_1}{\underset{|}{N}}(\overset{R_3}{\overset{|}{)}}.H(AC)$$

is an amine salt of the cation resin, $$R_2-\underset{R_1}{\underset{|}{N}}(\overset{R_3}{\overset{|}{)}}.HX$$

is an amine salt of the buffer and anion X,
(AN) is an anion resin; and
(AN)HX is a salt of the anion resin and anion X.

These and other features and advantages of the invention will become readily apparent as the invention becomes better understood by reference to the following detailed description when considered in conjunction with the accompanying drawings.

DETAILED DESCRIPTION OF THE PREFERRED EMBODIMENTS

The new improved buffers of this invention comprise compounds of the general formula:

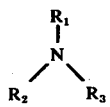

where $R_1$, $R_2$, and $R_3$ are H, branched or straight chain alkyl containing 1 to 6 carbon atoms or hydroxy substituted alkyl providing that the compound contains a minimum of two hydroxyl substitutents. It is preferred for practical and theoretical reasons that at least two of the hydroxy groups be separated from the nitrogen atom by not more than 3 and preferably 2 carbon atoms. The practical reason is to take advantage of the reduction is basicity of the compound afforded by the inductive effects of the OH groups. These inductive effects become negligible if the distance is greater than 3 carbon atoms. The theoretical reason is to assume a steric configuration in which the hydroxy group can readily associate with and shield the nitrogen from hydrolytic attack.

The buffer compounds may be further substituted with other groups known by those skilled in the art to inductively reduce basicity, such as the nitrile group, methoxyl group and the like.

The molecular weight of the buffer compounds should be less than about 500, and preferably less than 200 to avoid excessive swelling and deterioration of the resin particles. Their pK in water at 25° C should be with the range of 5 to 7.5.

Typical compounds which are utilizeable herein and which fall within the generalized structure include:

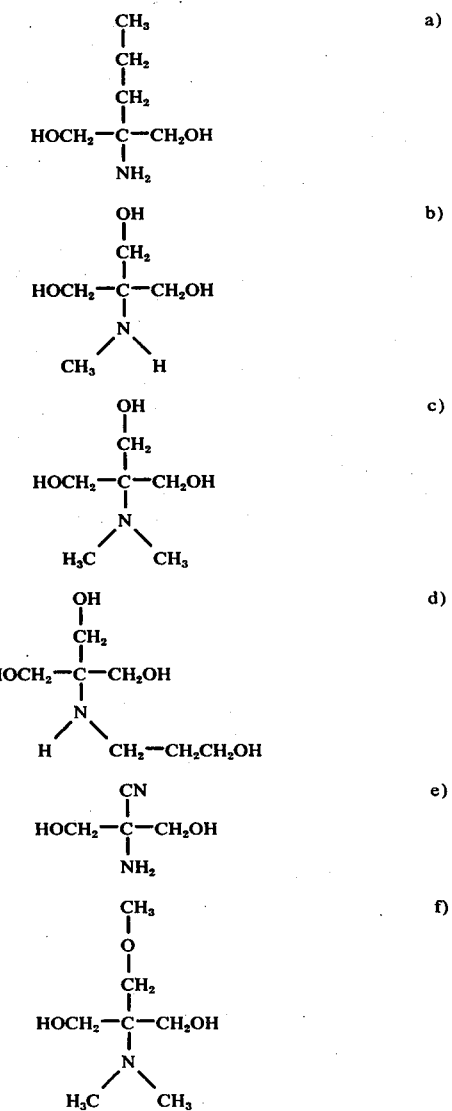

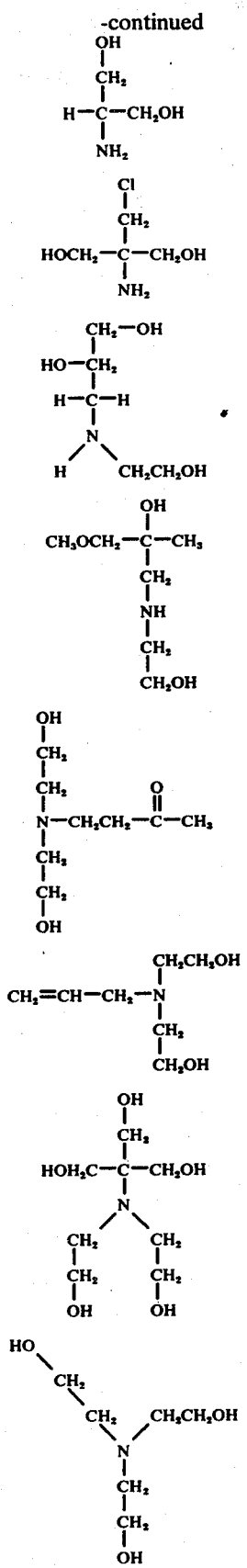

Electron withdrawing groups can be utilized as substituents on compounds within the generic structure to increase the pK. These groups include, nitro, aldehydo, keto, other halogens, sulfido, and alkenyl and alkynyl among others, as is seen in the compounds recited. The hydroxyl-substituted amine buffers can be used singly or in combination with each other or with other buffering agents, such as N-methylmorpholine. However, when combinations are utilized, the pK's of each buffer component should be substantially the same in order to prevent sequential deposition.

Figure 2:
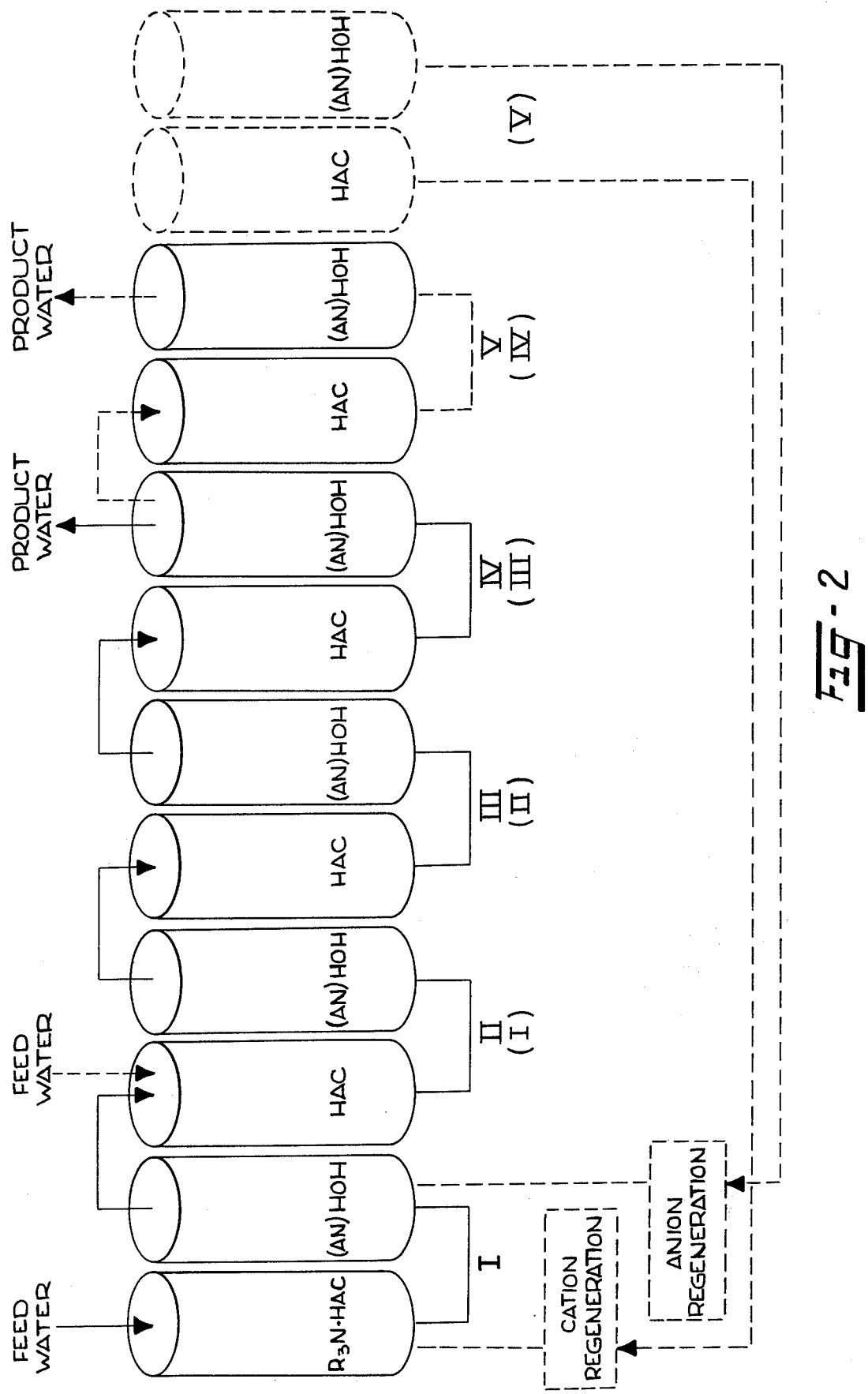
FIG. 2 is a schematic view of one embodiment of a water demineralization process that can utilize the buffers of this invention.

Referring now to FIG. 2 in the practice of the demineralization process, a plurality of cation and anion resin columns are alternated in a carousel arrangement in series with a paired arrangement, suitably at least 3 pairs, usually 4, with a fifth set as a spare. Initially, only the lead column in pair I is amine buffered. During loading with metal cation from the feed solution, the buffer is displaced primarily to the lead cation bed in pair II with a slight bleed to the lead cation column in pair III and only a trace bleed to the lead cation column in pair IV. For high quality water it is important that sufficient column pairs be used so that there is no bleed from the last pair when loading of the first pair is completed. This criteria places an optimum or maximum permissible loading of the first pair.

After both columns in pair I are loaded and the buffer is exhausted from the first cation column and all buffer has washed past the first pair, these columns are removed for regeneration and the columns in pair II become the lead pair of columns and the spare columns become the end columns. The columns in pair I after regeneration are placed in the position at the end of the carousel.

In the second cycle, shown in dotted lines, the lead columns of pair II remove the bulk of the mineral ions from the feed stock. The liberated buffer is mainly picked up by the cation column in pair III. Any residual anions not picked up in pair II are picked up in the following pairs in decreasing concentration.

While not disclosed here in complete detail, it is seen that this invention can be practiced using the carousel arrangement of the cited copending case, wherein a plurality of cation and anion resin columns are alternated + − + −, in paired series usually of 3 or 4 operating pairs and a spare pair. In this embodiment, after both columns in pair I are loaded, and the buffer is exhausted from the first cation column, and all buffer has washed past the first pair, these 2 columns are removed for regneration. The second pair become the new lead pair and the spare pair become the last pair of the operational sequence. In the next round the original third pair becomes the first and the original first is now on stream as the last pair, while original number 2 regenerates, ad infinitum.

The loaded cation and anion resins can be regenerated by conventional means, i.e., mineral acids and bases or by new sophisticated techniques employing chelating agents and amines. Continuous operation can be achieved in accordance with either embodiment of the invention by providing a spare anion exchange bed and spare cation exchange bed which are placed on stream during regeneration of the two spent beds.

The process is applicable to removal of water soluble inorganic salts from water, mainly halides, sulphates, sulfites, phosphates, phosphites, carbonates, bicarbonates, nitrites and nitrates, of such metals as K, Na, Ca, Ba, Mg, Sn, Fe, Cu, Zn, Al, V, Cr, Mn and others. Excellent results are obtained with the Group IA and IIA alkali and alkaline earth metals, the most naturally occurring impurities, since these are difficult to remove by nonbuffered processes. The process will also work on saline feeds containing mixtures of anions and/or cations.

While the process is economically intended for operations for the removal of metallic ions of soluble metal salts of the Group Ia, IIa, and those previously specifically recited metals, it is seen that the process is equally operative to remove those metallic ions of soluble salts which are removable without the use of a buffered system, for example by the process of U.S. Pat. No. 3,725,259 issued Apr. 3, 1973. Such additionally removable metal ions include Co, Ag, Au and Cd.

The pK of the resins, both cationic and anionic, should fall between about 3 and about 7. The resins are used in particulate bead form and may be large beads in the size range of 20–50 mesh or larger or small beads in the range of 40–80 mesh or smaller.

The weak cation-exchange resins which are particularly useful in the practice of this invention are those which contain phosphonous, phosphonic, phosphinic or phosphoric acid groups, and also those that contain carboxylic acid groups. The latter can conveniently be obtained by the copolymerization of compounds such as acrylic acid, methacrylic acid, acrylic esters, methacrylic esters, acrylonitrile or methacrylonitrile, and other unsaturated acrylates or nitriles with appropriate cross-linking agents such as divinylbenzene. If the resins are formed, however, from the polymerization of compounds containing ester or nitrile groups, hydrolysis to the corresponding acid must be effected prior to buffer addition. The ion-exchange resins preferred at this time are those which derived from acrylic or methacrylic acid.

Representative weak-acid resins are Amberlite IRC-50 (a carboxylic resin based on a methacrylic acid cross-linked copolymer ) having a pK of 6.1, Bio-Rex 63 (moderately acidic, pK 3.0 approximately phosphonic acid polystyrene type) of Biorad Corporation, Chelex-100 (very weakly acidic, pK 6.0–7.0, iminodiacetic acid polystyrene type), and Duolite CC-3 (a polyacrylic acid having a pK of 5.57) of Diamond Shamrock Corp. Duolite CC-3 is favored due to high loading capacity.

Weak "base" ion-exchange resins are generally resins having primary amine, secondary amine or tertiary amine as the principal functional group. Typically the weak base polyamines are copolymers of acrylonitrile and methyl acrylate cross-linked with divinylbenzene and then subjected to aminolysis with polyamines; copolymers of styrene-divinylbenzene chloromethylates treated with primary or secondary amines; and reaction products of phenolformaldehyde with a polyalkyleneamine. A weakly basic anion exchange resin may be defined as one which has a pK in water falling in the range of 3.0 – 7.0. Typical commercial weak base resins include Diamond Shamrock ES-340 an Amine/Epoxy polymer matrix with 85% amine functionality, Rohm & Haas Amberlite IRA-68 and IRA-94 both of which have amine functionality and pKs of 5.8 and 6.7 respectively.

In general, the pK of both the anion and cation resins should be as close as possible to 5. The pK of the buffer should preferably be within the range of 5 to 7.5. As alluded to before, the selection of the buffer should be made in conjunction with the strengths of the two resins, and the ease of loading of the inorganic salts to be removed, since the lower the pK of the buffer, the more efficiently the cation resin will load because the tendency for hydrolytic bleed of the buffer is minimized. The higher the pK of the buffer, the more efficiently the anion resin will load.

The loading of the cation resin from the feedwater is an ion displacement process and the efficiency of loading is therefore dependent upon the number of resin sites previously occupied by buffer cations. The number of these sites is dependent upon the bleed characteristics of the buffer with respect to the acid strength of the cation resin being utilized and the base strength of the buffer. Conversely the weaker the buffer (the higher its pk), the more acidic the buffer salt effluent from the cation resin will be when displacement of the buffer occurs. As a consequence thereof, the anion resin will load more efficiently.

The loading of the anion resin is a salt splitting process and the efficiency of loading is directly proportional to the acid strength of the buffer salts in the eluate from the cation resin column.

Figure 1:
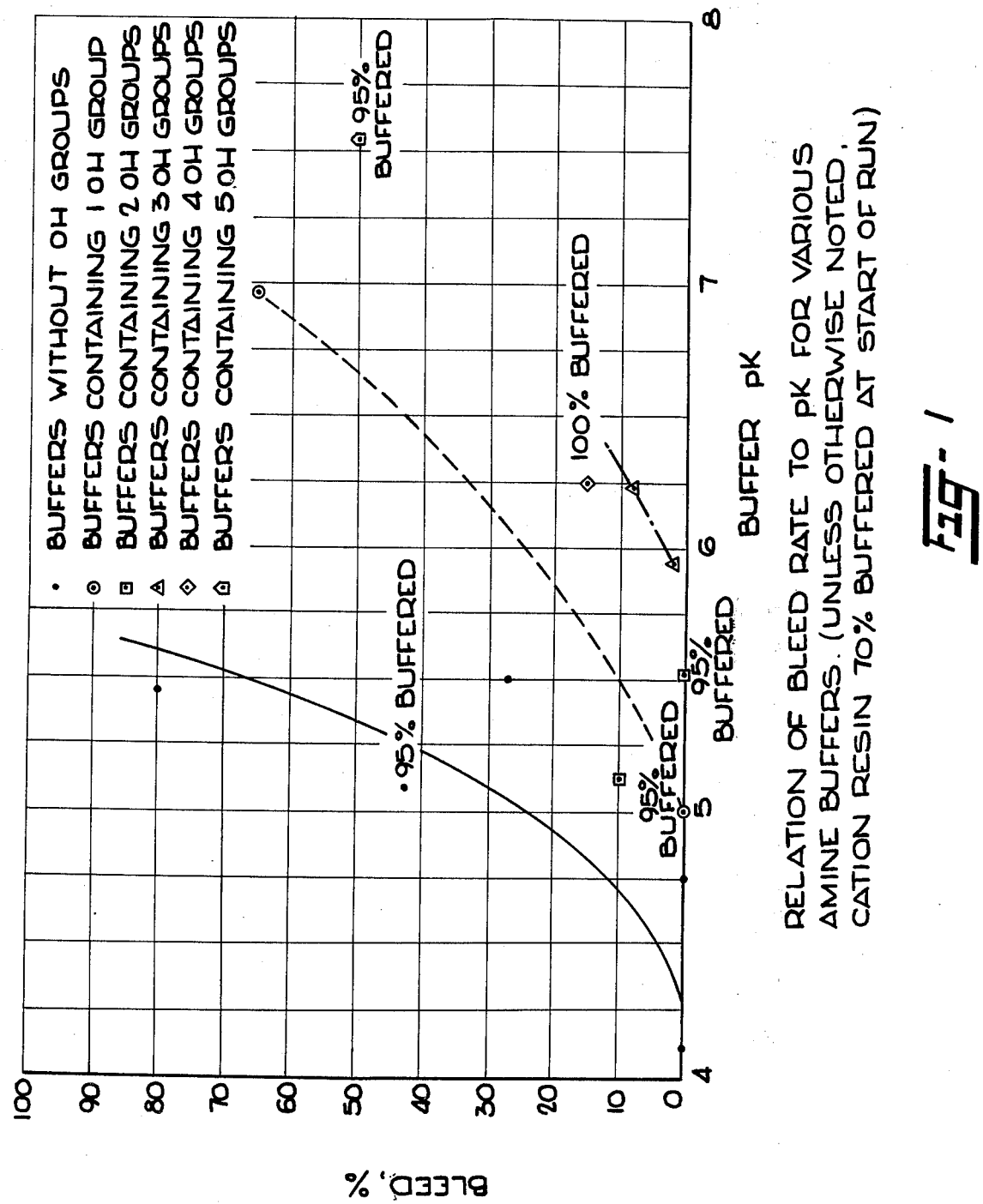
FIG. 1 is a graph depicting the relationship of bleed rate to pK for a variety of amine buffering agents employed in the processed of this invention.

It is recognized that as a general principle the weaker the amine buffer, i.e., (the higher the pK) the more serious is the problem of bleeding. Bleeding is defined as the removal of buffer from cation resin by hydrolysis rather than by displacement with a metallic ion. Therefore when a buffer is selected that provides an anion split resulting in high anion resin loading, the bleed rate from the cation resin becomes excessively high. The use of a different mechanism to offset this normal effect of pK on the bleed is provided by the use of the instant buffer compounds. The pronounced effect of the hydroxyl groups is demonstrated by the data shown in FIG. 1. In this figure the bleed % is plotted against the buffer pK for a number of buffer compound both within and outside of the scope of this invention. The bleed percentage obtained is defined as the amount of bleed occurring when one-half of the cation has been removed from the cation resin and is expressed as a percentage. This definition was chosen because the bleed rate varies as a function of time throughout the run and this designation gives a fair means of comparison.

Of the three types of compounds shown, ammonium and the alkylamines (not within the scope of this invention) show little or no bleed due to low pK. This conforms to the original premise recited. The morpholine derivatives which have reduced basicity due to the introduction of electron withdrawing substituents into the structure, though falling within a desireable pK range and thus suitable as buffers for the general procedure of our earlier copending application, show high bleed rates in accordance with the pK-bleed rate relationship recited above.

We have now found as shown in the plot that an introduction of a multiplicity of hydroxyl groups in a precise steric configuration with respect to the amine nitrogen atom, not only causes the pK to rise even higher to a more desireable range due to the electron withdrawing capability of the hydroxyl groups, but the bleed rate is significantly diminished.

While not bound to any theory we believe that the mechanism by which the bleed is reduced involves the solvation of the amine nitrogen by the pendant hydroxyl groups which shield the nitrogen from water solvation and resultant hydrolysis. It is this hydrolysis of the amine resin salt that causes bleed. By inhibiting hydrolysis it is possible to provide buffers of higher pK whose acid salts are more effectively split by the anion resin while at the same time reducing the buffer bleed from the cation resin. Thus higher buffering levels of the cation resin and higher resultant cation loadings are made possible. It has been found that for the hydroxyl groups to function in this particular manner it is necessary that the chain length of the pendant groups considering the bond angles involved be such as to permit a proper steric fit. Thus the number of linear carbon atoms separating the amine nitrogen from the hydroxyl oxygen should be two for optimum association between the hydroxyl and the amine.

Increasing the number of carbon atoms separating the nitrogen and hydroxyl groups has a two-fold effect on the buffering process. The desirable inductive effect of the hydroxy group upon the nitrogen to reduce basicity is the nitrogen is so diminished such that a separation of four or more carbon atoms makes this effect negligible. Secondly, an increase in the number of separating carbon atoms beyond three results in a steric effect which inhibits the approach of the hydroxyl groups to the nitrogen for shielding, while at the same time due to the increased molecular size of the buffer molecule an undesirable increase in the swelling of the cation resin takes place.

TABLE I

Practical Buffer Loadings
(Maximum Cation Buffer Loading Compatible with a 20% Buffer Bleed)

| Buffer | pK | Loading Level,% |
|---|---|---|
| Tris Hydroxyethyl Methylamine | 5.95 | 75 |
| Triethanolamine | 6.23 | 60 |
| N-Hydroxyl Ethyl Derivative of Trishyroxyethylmethylamine | 6.25 | 80 |
| Diethanolamine | 5.12 | 80 |
| N-Methydiethanolamine | 5.43 | 95 |
| Morpholine | 5.64 | 40–50 |
| N-Methylmorpholine | 6.50 | 30–35 |

From a practical standpoint it is desirable to select the buffer amine that provides both adequate cation loading and a buffer bleed percent of less than 30. When one compares the instant buffer amines with other buffering materials on this basis, even down to 20% bleed, the compounds of this invention can be loaded on polyacrylic acid ion exchange resins to levels of 80% or more. Morpholine in the other hand is restricted to a maximum buffer loading of 40–50%.

In brief, the compounds of this invention can be prepared by any generally acceptable synthesis route such that the end product contains at least two hydroxyl groups positioned as desired with respect to the amine nitrogen.

Such processes would incorporate any of the known techniques for alkylating amines, such as the Leukart reaction; condensation with ethlene oxide and others.

The following examples illustrate the preparation of buffer amines within the scope of this invention.

EXAMPLE I

Preparation of N-(hydroxyethyl),1-methoxy,2 hydroxy-isobutyl, 2-amine (compound j)

90 grams of 1-methoxy 1-2propenol, $CH_3OCH_2-C(OH)=CH_2$ were reacted with 72 grams of HCl. The product is then reacted with NaCN, and reduced using known techniques with hydrogen to the amine which was then ethoxylated with 1.2 moles of ethylene oxide.

EXAMPLES II AND III

Synthesis of 2-hydroxyethylamino tris(hydroxymethyl) methane and bis(2-hydroxyethyl) amine tris(hydroxymethyl) methane a. 2M aqueous solution of 2-amino-2-(hydroxymethyl)-1,3-propanediol was prepared and chilled to 0° C. To prepare the mono-tris reaction product a stoichiometric amine of ethylene oxide was added to the chilled solution without stirring, and for the bis-tris reaction product a twice the theroretical amount of ethylene oxide was added.

b. After addition of the ethylene oxide, the reaction solution was brought to room temperature and held there for 2 hours, then heated to 60° C an held there for an extended period of time.

c. The mixture was concentrated to ⅓ of the original volume.

d. Approximately 150 ml of ETOH was added to the mono-tris reaction solution. The solution was let stand at room temperature. Some white powder crystals were collected and others were subsequently obtained by boiling of the mother liquor and crystalizing in the cold.

e. For the bis-hydroxyethyl-tris product, the volume was reduced to ⅓rd the original volume; ethanol was added and the product obtained by crystalizing in the cold.

Normally an amine nitrogen in a water medium is hydrated and the displacement of the amine salt from the cation resin occurs because of the ionization of some water molecules to form $H^+$ and $OH^-$ ions. The $H^+$ ions can then displace the amine from the resin. But when the water of hydration is prevented from associating with the amine nitrogen because of the solvation of the hydroxyl groups as specifically configured in the present compounds, this effect is minimized. The amine nitrogen is offered no interference in its attempt to bond to the resin.

A further requirement for providing a stable bond for the nitrogen to the resin is the proximity of which the nitrogen is able to approach the phosphonic group or the carboxyl group of the resin. Therefore while a certain amount of shielding is desired for one purpose the shielding may not be of such amount as to overkill, i.e., prevent the nitrogen from approaching the carboxyl group.

It is believed that a 2 to 3 carbon atom distance for the separation from the nitrogen to the hydroxyl groups provides the best shielding, yet allows the nitrogen to properly move in and fit with the acid group be it —$PO_4$ or —COOH, etc., of the resin.

We have found that in addition to the 2–3 carbon atom distance which gives the best shielding, the number of hydroxyethyl groups attached directly or indirectly to the nitrogen should be two or more in number in order to provide adequate solvation. One hydroxyethyl group has some effect as in beta-hydroxy ethyl morpholine, and also that more than two in some cases depending on molecular geometry may give superior results, provided that the total bulk proximate to the location of the amine nitrogen does not interfere with salt formation. Though groups other than hydroxyl can achieve solutions of the amine, they present alternative problems such as large size which would tend to inhibit the salt formation, or toxicity.

The buffer compounds should satisfy the following criteria:

1. Quantitative displacement by the cations of the feed stream.

2. The amine nitrogen is sufficiently solvated by shielding such that displacement by hydrolysis cannot take place, whereby the resultant bleed is minimized, while allowing sufficient access for the nitrogen to associate with the resin.

3. Sufficiently weakly basic such that the conjugate acid salts are sufficiently acidic to be efficiently split by the anion resin and are non-volatile at operating temperatures.

Superior results are obtained with the use of these specific buffers in that buffer loadings of the cation resin on the order of 50% to 80% or even more can be achieved, while simultaneously maintaining high anion resin loadings on the order of 50%–60% due to the acidity of the cation effluent.

Other compounds that are not among the preferred buffer compounds due to the greater than 3 carbon atom distance between the amine nitrogen atom and the hydroxyl group include:

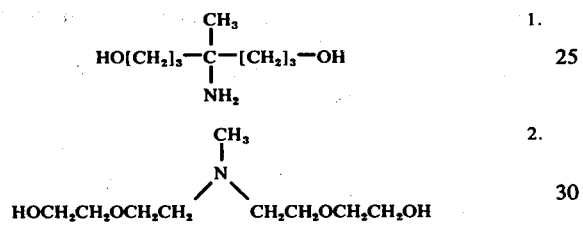

The buffers of this invention offer a practical balance between bleed rate and pK, such that satisfactory cation loadings can be achieved, consistent with efficient deposition of anions on the second anion column. The specific selection of a buffer within those of this invention must be made after considerations of the ionic content of the feed water, and the concentration of the minerals in the feedwater, (both cation and anion). Thus, for feedwater high in sulfate, phosphate and low in chloride, efficient deposition of these anions can be expected an a buffer of low pK is acceptable. If the concentration of mineral ions of the feedwater is low, e.g., less than 400 ppm, then hydrolysis and subsequent bleed is a more serious consideration, and minimum bleed of the buffered cation is desirable and the selection should be of a high pK buffer with minimum bleed characteristics.

It has been found that the presence of hydroxyl groups on the buffer molecule reduce the bleed amount. The reduction in bleed amount is related to the number of OH groups present on the amine. The OH groups have an additional significant effect in reducing basicity of the nitrogen atom when the OH groups are separated by no more than 3 carbon atoms from the nitrogen. It is therefore possible by the use of, and the positioning of the hydroxyls to obtain buffers with low bleed rates in various pK ranges thereby providing an opportunity to select the desired combination of bleed and pK range of operability depending on the nature of the feedwater and the ion exchange resins employed.

It is to be realized that only preferred embodiments of the invention have been described and that numerous substitutions, alterations and modifications can be made without departing from the spirit and scope of the invention as defined in the following claims.

What is claimed is:

1. A process for demineralizing water comprising the steps of:

passing an amine buffer of the formula:

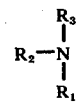

where $R_1$, $R_2$ and $R_3$ are selected from hydrogen, alkyl of 1 to 6 carbon atoms or hydroxyalkyl provided that the amine buffer contains at least two hydroxyl groups and at least two of the hydroxyl groups are separated from the nitrogen atom by from 1 to 3 linear carbon atoms; through a bed of weakly acidic cation exchange resin in hydrogen form of the formula, H(AC) having a pK of from 5.0 to 7.5 to form a buffer amine salt bed of the cation resin of the formula:

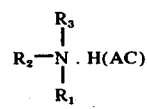

passing feedwater containing dissolved mineral salts of the formula, MX, where M is a metal cation and X is an anion through said buffer amine salt bed and ionically exchanging the metal ion with the amine of the resin salt to form a first effluent containing a dissolved amine salt of the formula:

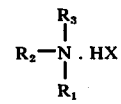

passing the first effluent through a bed of weakly basic anion exchange resin having a pK from 5.0 to 7.5 and depositing the anions, X, thereon to form a second effluent containing said amine buffer.

2. A process according to claim 1 in which the separation of the hydroxyl groups from the nitrogen atom is no more than 2 linear carbon atoms.

3. A process according to claim 1 in which the second effluent is passed through a bed of weakly acidic cation resin and depositing the amine buffer to form an amine salt of the cation resin.

4. A process according to claim 1 in which the amine buffer is trishydroxymethylamine methane.

5. A process according to claim 1 in which the amine buffer is bis-(N-2-hydroxyethyl)-tris-hydroxymethyl amine.

6. A process according to claim 1 in which the ion exchange resins are in the form of particles having a mesh size from 20–80.

7. A process according to claim 1 wherein the resin contains moieties selected from the group consisting of phosphonous, phosphonic, phosphinic, and phosphoric acids.

8. A process according to claim 1 wherein the resin contains carboxylic acid groups.

9. A water dimineralizing system comprising in in combination;

a first column having a first inlet for receiving feed water and a first outlet for delivering a first effluent containing a bed of buffer amine resin salt of an amine buffer of the formula:

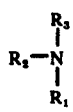

where $R_1$, $R_2$ and $R_3$ are selected from hydrogen, alkyl of 1 to 6 carbon atoms or hydroxyalkyl provided that the amine buffer contains at least two hydroxyl groups and at least two of the hydroxyl groups are separated from the nitrogen atom by from 1 to 3 linear carbon atoms; and of a weakly acidic cation exchange resin in hydrogen form of the formula, H(AC) having a pK of from 5.0 to 7.5; said buffer amine resin salt being of the formula:

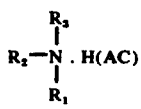

feed means connected to the first inlet for passing feedwater containing dissolved mineral salts of the formula, MX, where M is a metal cation and X is an anion through said buffer amine salt bed whereby the metal ion, M is ionically exchanged with the amine of the resin salt to form a first effluent leaving the first outlet containing a dissolved amine salt of the formula:

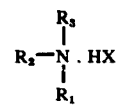

a second column having a second inlet and a second outlet, said second inlet being connected to the first outlet for receiving the first effluent and containing a bed of weakly basic anion exchange resin having a pK from 5.0 to 7.5 for depositing the anions, X, thereon to form a second effluent containing said amine buffer leaving the second outlet; and a third column containing a bed or weakly acidic cation exchange resin in hydrogen form of the formula, H(AC), having a pK of from 5.0 to 7.5 and having a third inlet connected to the second outlet for receiving the second effluent and for depositing amine buffer on said third bed of resin and having a third outlet for delivering a flow of demineralized third effluent.

* * * * *